United States Patent [19]

Prevedello et al.

[11] Patent Number: 5,490,877
[45] Date of Patent: Feb. 13, 1996

[54] LOW-VISCOSITY CEMENT COMPOSITION

[75] Inventors: Aldo Prevedello; Goffredo Romano, both of San Donato Milanese, Italy

[73] Assignees: Eniricerche S.p.A.; Snamprogetti S.p.A., both of Milan, Italy

[21] Appl. No.: 291,830

[22] Filed: Aug. 17, 1994

Related U.S. Application Data

[62] Division of Ser. No. 130,156, Sep. 30, 1993, abandoned, which is a continuation of Ser. No. 280,558, Dec. 6, 1988, abandoned.

[30] Foreign Application Priority Data

Dec. 18, 1987 [IT] Italy .................................. 23090 A/87

[51] Int. Cl.$^6$ .................................. C09D 195/00
[52] U.S. Cl. .................. 106/668; 106/725; 106/807
[58] Field of Search .................. 106/90, 96, 315, 106/668, 725, 807

[56] References Cited

U.S. PATENT DOCUMENTS

| 2,512,067 | 6/1950 | Linford ........................ 106/90 |
| 3,970,690 | 7/1976 | Suzuki et al. ................. 106/96 |
| 4,224,076 | 9/1980 | Moitra et al. ................. 106/90 |
| 5,037,790 | 8/1991 | Clerici et al. ................ 502/162 |
| 5,221,344 | 6/1993 | Prevedello et al. ............ 106/807 |
| 5,322,556 | 6/1994 | Prevedello et al. ............ 106/275 |

FOREIGN PATENT DOCUMENTS

| 0341791 | 11/1989 | European Pat. Off. . |
| 2261659 | 12/1972 | Germany ........................ 106/90 |
| 171257 | 9/1985 | Japan ............................ 106/96 |
| 983102 | 12/1982 | U.S.S.R. ........................ 106/96 |
| 2159536 | 12/1985 | United Kingdom . |

OTHER PUBLICATIONS

Chemical Abstracts, vol. 78, (1973) no month available, p. 207, No. 7339m.
Chemical Abstracts, vol. 84, (1976) no month available, p. 306, No. 94607n.
Chemical Abstracts, vol. 105, (1986) no month available, p. 299, No. 65280x.

*Primary Examiner*—David Brunsman
*Attorney, Agent, or Firm*—Oblon, Spivak, McClelland, Maier, & Neustadt

[57] ABSTRACT

Disclosed is a low-viscosity cement composition, useful in the field of oil drilling, comprising cement, water and an additive obtained by salifying into the alkali-metal, alkali-earth metal, or ammonium salt, the sulphonated and oxidated products derived from the reaction between sulphur trioxide and cookery tar or sulphur trioxide and fuel oil from steam cracking; the cement composition is endowed with improved rheological characteristics such as a low-viscosity value without substantial changes in the pumping times, even at high temperatures and pressures.

16 Claims, No Drawings

LOW-VISCOSITY CEMENT COMPOSITION

This application is a Division of application Ser. No. 08/130,156, filed on Sep. 30, 1993, now abandoned, which is a Continuation Application of Ser. No. 07/280,558, filed on Dec. 6, 1988, also abandoned.

The present invention relates to low-viscosity cement composition, particularly useful in the field of oil drilling.

In oil drilling, cement compositions are used in the cementation of the bore lining columns, and in the sealing of porous formations not concerning-the beds from which the production has to be obtained. The cements suitable for the intended purpose were classified by A.P.I. (American Petroleum Institute) into classes A, B, C, D, E, F, G and H, as a function or their characteristics and uses.

API cements which are classified in classes A–H have the following water contents:

| Class | % Water Based on Cement |
| --- | --- |
| A | 46% |
| B | 46% |
| C | 56% |
| D | 38% |
| E | 38% |
| F | 38% |
| G | 44% |
| H | 38% |

The water content may be expressed as a ratio of water to cement wherein the low ratio is 0.38 and the high ratio is 0.56.

The cement compositions used in oil drilling operations undergo variable conditions of temperature and pressure, which occur at the various depths inside the bores. For these compositions, special rheological characteristics are required, and, in particular, a good fluidity, combined with pumpability times adequate to the various conditions of use.

Additives are known in the art, which are added to the cement compositions, or to concrete compositions, in order to improve the processability thereof, or in order to reduce their water content. In particular, U.S. Pat. No. 3,277,162 discloses an additive basically constituted by the water-soluble sulphonated salt of the reaction products of naphthalene-sulphonic acid with formaldehyde. Such an additive can be used, among others, in order to decrease the water losses suffered by the cement compositions used in the oil drilling, in particular when said compositions are under pressure in the nearby of permeable formations.

However, such an additive is expensive, and the need for having available cheaper additives is felt.

Furthermore, the need is felt, for having available additives capable of further improving the rheological characteristics of the cement compositions, in particular, their fluidity, without substantially changing the pumpability times, so as to render the same compositions more suitable for use under the conditions occurring inside the oil wells.

The present Applicant has found now that such needs can be satisfied by means of the cement composition according to the present invention, which contains cement, water, and is essentially characterized in that it additionally contains an additive obtained by salifying into an alkali-metal, alkali-earth metal or ammonium salt, the sulphonated and oxidated products deriving from the reaction between sulphur trioxide and cokery tar, or fuel oil from steam cracking.

Cokery tar is the residual hydrocarbon fraction from coal distillation processes.

Steam cracking fuel oil is the residual hydrocarbon fraction from the processes of production of ethylene and other lower olefins by means of the thermal cracking of mineral naphthas and gas oils.

These hydrocarbon fractions show a high content of aromatic compounds, and at least 50% by weight of these latter are bicyclic aromatic compounds, in particular naphthalenes, according to ASTM D-3239-81 Standard.

The additive used in the composition according to the present invention is obtained by making either liquid or gaseous sulphur trioxide react with the hydrocarbon phase, by operating with a mutual ratio of such reactants comprised within the range of from 0.4/1 to 2.5/1 by weight. In particular, the values near the lower limit of such a ratio should be preferably used in case of steam cracking fuel oil, and the values near the upper limit of the same ratio should be used in case of cokery tar.

The reaction is advantageously carried out by:

dissolving the hydrocarbon fraction in an organic solvent inert towards the sulphonation reaction;

placing the so-obtained solution into contact with either liquid or gaseous sulphur trioxide, complying with the above reported mutual ratios between the reactants;

allowing the reaction to proceed at a temperature comprised within-the range of from 90° C. to 120° C. for a time of from 0.5 to 3 hours, removing sulphur dioxide which evolves during the course of the reaction;

neutralizing the reaction products, after cooling, with an alkali-metal or an alkali-earth metal basis or with ammonia, and preferably with aqueous sodium hydroxide:

recovering the additive from the neutralization products by removing the organic solvent, and at least a portion of water.

For further details as to the sulphonation process, reference is made to the disclosure of European patent application publication Nr. 233,951.

In the treatment with sulphur trioxide, besides the sulphonation of the hydrocarbon fraction, also an oxidation effect takes place, as demonstrated by the sulphur dioxide which develops during the reaction. The additive obtained is in any case a solid, which contain a major portion of organic sulphonate, and minor amounts of alkali-metal, alkali-earth metal or ammonium sulphate, besides the possible residual moisture.

Such an additive is added to the cement compositions in amounts of the order of from 2 to 6 parts by weight, and preferably in amounts of the order of from 3 to 5 parts by weight, per each 1,000 parts by weight of cement. Preferably, A.P.I. cements are used.

The additive according to the present invention is cheap, owing to the raw materials used, and is obtained by means of a simple and cheap process. Furthermore, the same additive endows the cement compositions into which it is incorporated, With good rheological properties, in particular a good fluidity, without appreciably varying their pumpability times, even at high temperature and pressure values.

In the following experimental examples, two additives are used, and, in greater detail:

Additive "A": obtained by sulphonating cokery tar with sulphur trioxide, with a weight ratio of said sulphur trioxide to said cokery tar of 2/1, and neutralizing with sodium hydroxide the so-obtained sulphonation product.

Such an additive has the following composition:

Organic sulphonate: 64.2% by weight;

Sodium sulphate: 30.8% by weight;

Water: 5.0% by weight.

Additive "B": obtained by sulphonating steam cracking fuel oil with sulphur trioxide, with a weight ratio of said sulphur trioxide to said steam cracking fuel oil of 0.66/1, and neutralizing with sodium hydroxide the so-obtained sulphonation product.

Such an additive has the following composition:

Organic sulphonate: 79.7% by weight;
Sodium sulphate: 12.7% by weight;
Water: 7.6% by weight.

EXAMPLE 1 (Comparative Example)

By operating according to American Petroleum Institute, A.P.I., Specifications for Materials and Testing for Well Cements (A.P.I. Spec. 10, Third Edition, Jul. 7, 1986, pages 14–15), a cement composition is prepared, which contains 1,000 parts by weight of A.P.I. "G" cement, and 440 parts by weight of fresh water.

On this composition, the rheological characteristics are determined by means of the FANN rotary viscometer, which are reported in Table 1, and the pumpability characteristics are determined as well, and are reported in Table 2.

EXAMPLE 2

A cement composition containing 1,000 parts by weight of A.P.I. "G" cement, 440 parts by weight of fresh water and 4.7 parts by weight of the "A" additive is prepared and characterized in the same way as disclosed in Example 1.

The results are reported in Tables 1 and 2.

EXAMPLE 3

A cement composition containing 1,000 parts by weight of A.P.I. "G" cement, 440 parts by weight of fresh water and 2.9 parts by weight of the "B" additive is prepared and characterized in the same way as disclosed in Example 1.

The results are reported in Tables 1 and 2.

TABLE 1

| Rheological Characteristics | Example 1 | | Example 2 | | Example 3 | |
|---|---|---|---|---|---|---|
| Reading at 600 rpm | 107 | 95 | 84 | 71 | 50 | 50 |
| Reading at 300 rpm | 79 | 71 | 53 | 46 | 28 | 26 |
| Reading at 200 rpm | 69 | 60 | 42 | 39 | 20 | 21 |
| Reading at 100 rpm | 58 | 48 | 32 | 30 | 15 | 15 |
| Reading at 6 rpm | 26 | 18 | 18 | 20 | 9 | 11 |
| Reading at 3 rpm | 17 | 13 | 15 | 15 | 8 | 10 |
| K' g. sec. n/100 cm$^2$ | 5.04 | 3.64 | 4.90 | 5.15 | 2.62 | 3.64 |
| n' — | 0.33 | 0.37 | 0.27 | 0.24 | 0.27 | 0.21 |
| Test temperature (°C.) | 27 | 52 | 27 | 52 | 27 | 52 |

TABLE 2

| Pumpability Characteristics | Example 1 | Example 2 | Example 3 |
|---|---|---|---|
| Pumpability time (minutes) | 119 | 140 | 135 |
| Test pressure (kPa) | 35,600 | 35,600 | 35,600 |
| Test temperature (°C.) | 52 | 52 | 52 |

We claim:

1. A method of cementing a bore lining column, comprising: cementing a bore lining column with a low-viscosity cement composition comprising:
   i) cement;
   ii) water; and
   iii) an additive produced by neutralizing the sulfonated and oxidized products derived from the reaction between sulfur trioxide and fuel oil from steam cracking, with an alkali metal, an alkali earth metal or an ammonium salt.

2. The method of claim 1, wherein said sulfonated and oxidized products derived from the reaction between sulphur trioxide and said hydrocarbon is carried out at a weight ratio of sulphur trioxide to hydrocarbon of from 0.4:1–2.5:1.

3. The process of claim 1, wherein said low-viscosity cement composition comprises from 2 to 6 part by weight of said additive per 1,000 parts by weight of said cement.

4. The process of claim 1, wherein said low-viscosity cement composition comprises from 3 to 5 part by weight of said additive per 1,000 parts by weight of said cement.

5. The process of claim 1, wherein said fuel oil from steam cracking is a residual hydrocarbon fraction from a process of producing ethylene and other lower olefins by means of thermal cracking of mineral naphthas and gas oils.

6. The process of claim 1, wherein said hydrocarbon comprises at least 50 wt. % of bicyclic aromatic compounds.

7. The process of claim 1, wherein said bicyclic aromatic compounds are naphthalenes.

8. The process of claim 1, wherein said low-viscosity cement has a pumpability time at 52° C. of from 135 to 140 minutes.

9. A method of sealing a porous formation comprising sealing a porous formation with a low-viscosity cement composition comprising:
   i) cement;
   ii) water; and
   iii) an additive produced by neutralizing the sulfonated and oxidized products derived from the reaction between sulfur trioxide and fuel oil from steam cracking, with an alkali metal, an alkali earth metal or an ammonium salt.

10. The method of claim 9, wherein said sulfonated and oxidized products derived from the reaction between sulphur trioxide and said hydrocarbon is carried out at a weight ratio of sulphur trioxide to hydrocarbon of from 0.4:1–2.5:1.

11. The process of claim 9, wherein said low-viscosity cement composition comprises from 2 to 6 part by weight of said additive per 1,000 parts by weight of said cement.

12. The process of claim 9, wherein said low-viscosity cement composition comprises from 3 to 5 part by weight of said additive per 1,000 parts by weight of said cement.

13. The process of claim 9, wherein said fuel oil from steam cracking is a residual hydrocarbon fraction from a process of producing ethylene and other lower olefins by means of thermal cracking of mineral naphthas and gas oils.

14. The process of claim 9, wherein said hydrocarbon comprises at least 50 wt. % of bicyclic aromatic compounds.

15. The process of claim 14, wherein said bicyclic aromatic compounds are naphthalenes.

16. The process of claim 9, wherein said low-viscosity cement has a pumpability time at 52° C. of from 135 to 140 minutes.

* * * * *